(No Model.)
W. A. CROCKER.
MACHINE FOR SEPARATING PEANUTS FROM THE VINE AND FOR STEMMING, CLEANING, AND GRADING SAME.
No. 502,619. Patented Aug. 1, 1893.
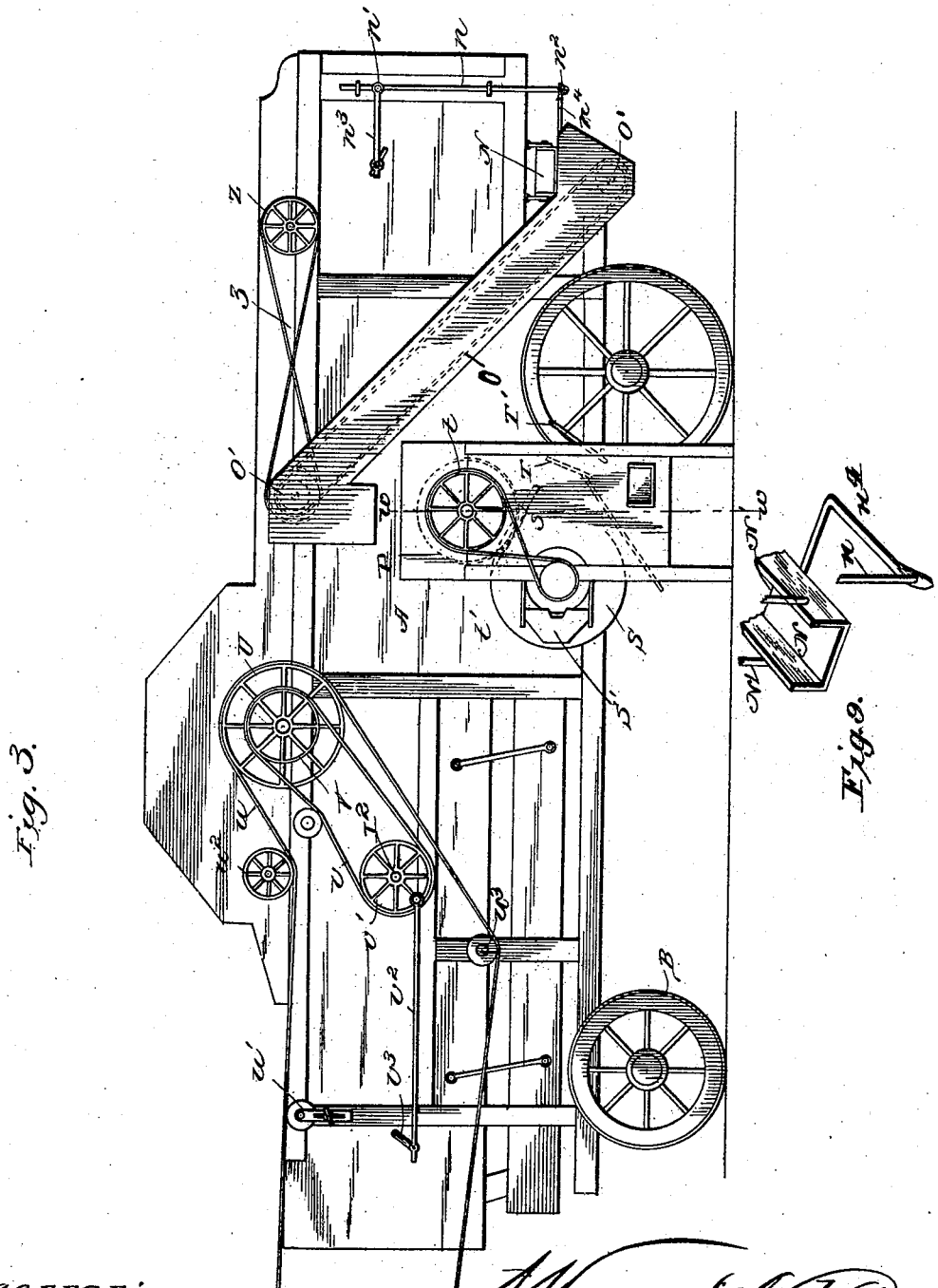

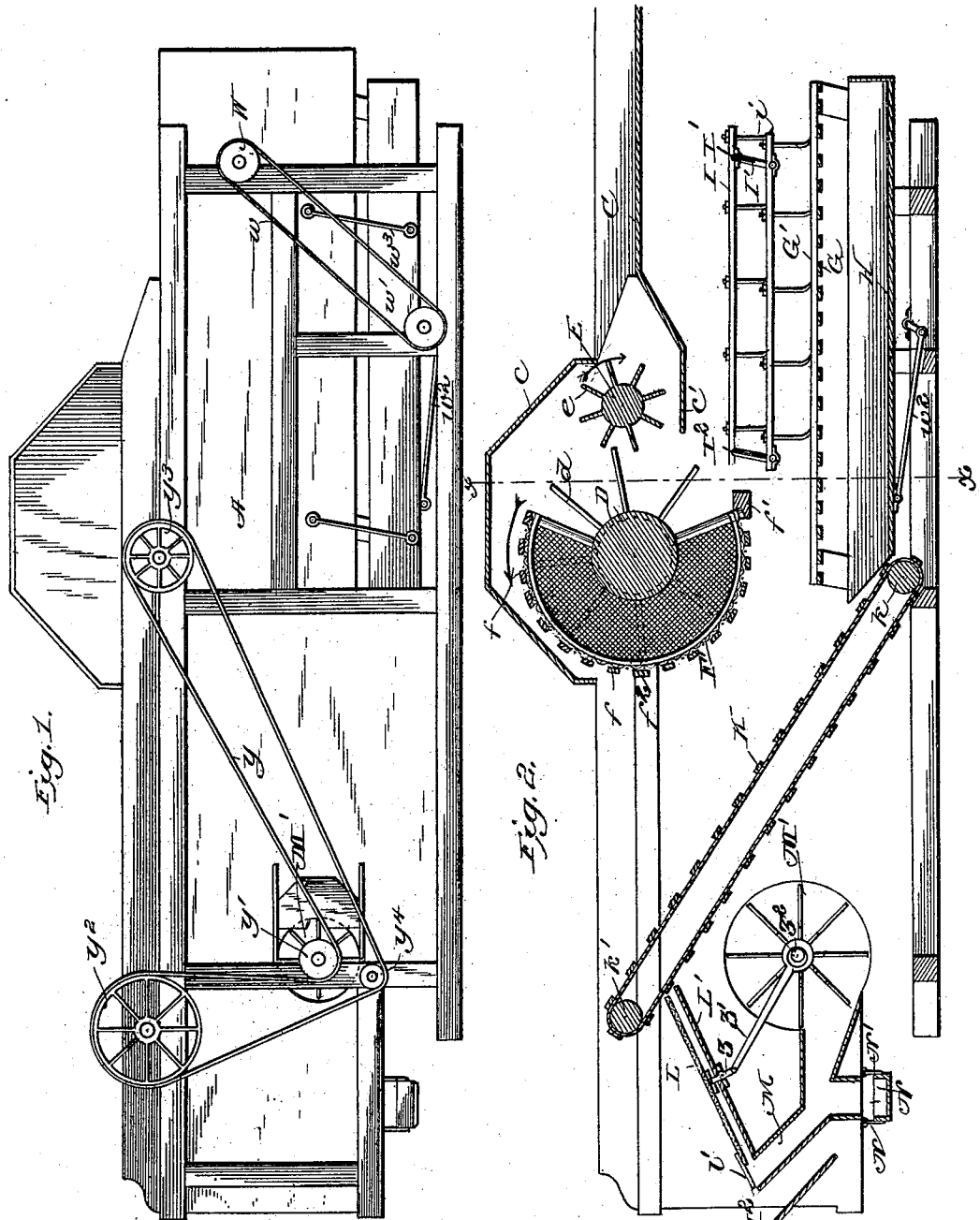

(No Model.) 3 Sheets—Sheet 3.
W. A. CROCKER.
MACHINE FOR SEPARATING PEANUTS FROM THE VINE AND FOR STEMMING, CLEANING, AND GRADING SAME.
No. 502,619. Patented Aug. 1, 1893.
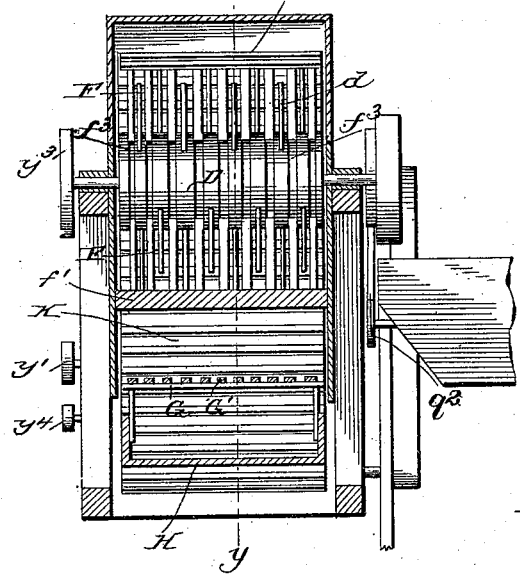
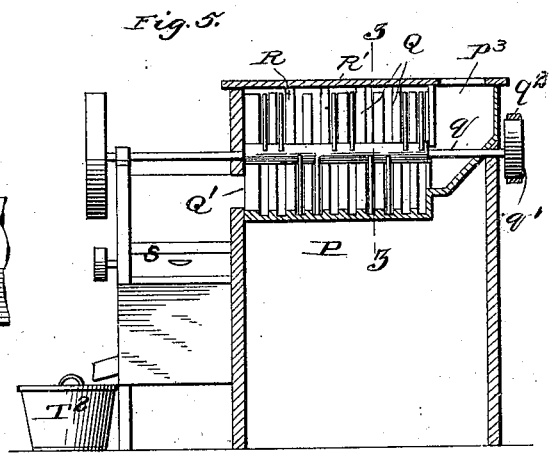
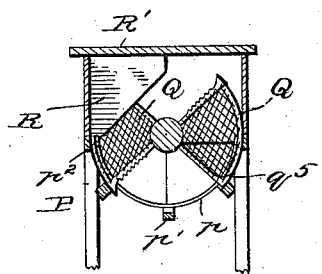
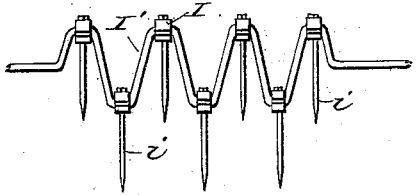
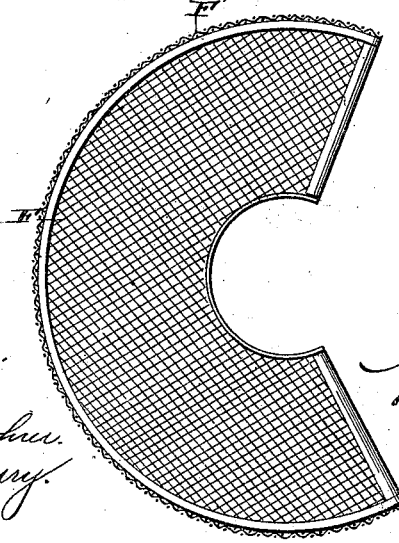
Witnesses:
Henry T. Asher
S. Stansbury
Inventor:
William Crocker
By Duvall & Co.
His Attorneys

UNITED STATES PATENT OFFICE.

WILLIAM A. CROCKER, OF EMMERTON, VIRGINIA.

MACHINE FOR SEPARATING PEANUTS FROM THE VINE AND FOR STEMMING, CLEANING, AND GRADING SAME.

SPECIFICATION forming part of Letters Patent No. 502,619, dated August 1, 1893.

Application filed January 24, 1893. Serial No. 459,633. (No model.)

*To all whom it may concern:*

Be it known that I, WILLIAM A. CROCKER, a citizen of the United States, residing at Emmerton, in the county of Richmond and State of Virginia, have invented certain new and useful Improvements in Machines for Separating Peanuts from the Vine and for Stemming, Cleaning, and Grading the Same; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in machines designed to carry out all the usual steps incident to the preparation of peanuts for the roasting operation after they have been gathered clinging to the vines, that is to say, for thrashing the same from the vines and separating, stemming, cleaning and grading them ready for market.

With these objects in view the invention consists in certain novel details of construction and combinations and arrangements of parts all as will be hereinafter described and pointed out particularly in the appended claims.

Referring to the accompanying drawings, Figure 1, is a side elevation of a machine constructed in accordance with my invention. Fig. 2, is a longitudinal vertical section through the same, on line *y y* of Fig. 4. Fig. 3, is a side elevation taken from the side opposite to Fig. 1. Fig. 4, is a transverse sectional view on the line *x x* Fig. 2. Fig. 5, is a detail section of the stemmer and grader, on line *w—w* of Fig. 3. Fig. 6, is a transverse section of the upper portion of the same, on line *z—z* of Fig. 5. Fig. 7, is a detail elevation looking at the end of the vine discharging conveyer. Fig. 8, is a detail of one of the beater partitions, and Fig. 9 is a detail view of the trough-vibrating mechanism.

Similar letters of reference in the several figures denote the same parts.

Referring now more particularly to Figs. 1 and 3 it will be seen that I have provided a housing or casing A constituting a main frame, which is mounted on truck B of usual construction, and is adapted to contain the major portion of the mechanism for operating upon the vines and peanuts. The top of this main frame or housing at one end is formed into a table or shallow hopper C for the reception of the vines just as they come from the field, *i. e.* with the peanuts and usual amount of dirt and rubbish clinging thereto and forward of this hopper the housing is enlarged or made into a dome *c* for the accommodation of the beater D to be presently more specifically described and the force feed cylinder E. The latter is located in the opening from the hopper and to facilitate the proper entry of the vines carrying the peanuts to the beater the hopper bottom extends forward beneath the feed cylinder at *c'* to a point in proximity to the beater. Both the force feed cylinder and beater are preferably formed by the cylinder having a series of radial arms lettered *d* and *e* respectively, but the beater is much the larger and heavier of the two, as will be seen from an inspection of Fig. 2 and they are adapted to be rotated in opposite direction, the feed cylinder as shown by the arrow being rotated toward the bottom and the beater toward the top of the machine with relation to the opening from the hopper.

The beater which receives the vines from the feed cylinder is adapted to tear or separate the peanuts therefrom, and to effectually accomplish this very important result I provide a foraminous or openwork inclosing casing extending partially around the beater and having a series of partitions preferably also foraminous or openwork, between which partitions the arms on the beater travel in their rotation, thereby dragging the vine through relatively small rough passages and effectually removing all the peanuts therefrom and finally discharging the vines at the bottom of the casing in position to be ejected from the machine.

In the preferred construction of beater cylinder or casing as I shall term the part surrounding the beater I form a series of segmental diaphragms F (Fig. 8) by bending up iron rods to form the edge and then stretch wire netting over the frame so formed, each partition has a central opening for the reception of the cylinder or central portion of the beater which latter is preferably recessed for the reception of such wire edges as shown clearly in Fig. 4. Around the outside of the partitions a series of transverse slats $f$ are secured by cross wires and staple or other suitable fastenings and the whole is held rigidly in place by the bottom cross timber $f'$ and enlarged rear slat $f^2$ (Fig. 2). The partitions in addition to being held by the slats are held against lateral movement by seating in the grooves or recesses $f^3$ in the cylinder as before mentioned. Thus there is no chance for them to become distorted or bent out of shape by the vines or being struck by the arms of the beater. The peanuts torn or pulled off of the vines by the beater drop down through a grating formed by the bottom transverse bars G and upper longitudinal slats G' into a shaking tray H, while the vines and all the larger rubbish are caught on the said grating and discharged from the machine through an opening at the rear end by a vine conveyer consisting of a double series of rake bars I having depending teeth $i$, said series of bars being mounted respectively on oppositely cranked portions of crank shaft I' journaled in the main casing and rotated by mechanism to be hereinafter described.

In operation the rake bars are advanced along over the grating while in lowered position and drawn back when in elevated position, the result being to move the vines out toward the rear which movement is somewhat facilitated by arranging the upper bars of the grating longitudinally as before described. To further facilitate the moving of the vines and also to assist in stirring the same up to effectually guard against any loose peanuts being carried out by the vines, the teeth $i$ are curved toward the rear as shown. The long vines having now been separated from the peanuts and short trash such as will pass through the grating the said peanuts and shorter trash is shaken off or out of the tray H down upon the lower end of an endless conveyer K traveling over a pulley $k$ at the bottom and a drive pulley $k'$ at the upper forward end of the machine from which point they drop down upon an inclined shaking screen L working above an inclined table L' at the lower end of which is an oppositely inclined chute M down which the good peanuts drop.

An air blast is provided for preventing the entry of lighter waste material such as fine trash, hulls, &c., into the chute and as a convenient structure I employ a rotary fan M' the discharge duct from which opens into the chute M and in traveling up the same carries out all save the good heavy peanuts and further prevents the entry of any dirt or trash. To effectually guard against the possibility of good peanuts being carried away by not passing through the screen L and hence tailing off over the chute the lower end of the screen is provided with a series of fingers or extensions $l$ separated somewhat from each other and arranged directly over the mouth of the chute; hence any heavy peanuts at once drop through while the lighter waste material is blown over and tails away as ordinarily. A second grade of peanuts may be saved at this point by providing a second chute $M^2$ but practically it is not desirable to separate at this point and the second grade is almost valueless.

The shaking screen L is operated by a lever $z$ pivoted in the table L' and jointed at the lower end to the upper end of a connecting rod Z' terminating in a box surrounding an eccentric $Z^2$ on the fan shaft. The upper wall of the discharge opening of the fan it would be noted is arranged in line with the vanes of the fan when in horizontal position, or in other words, said wall is arranged radially to said fan shaft whereby back pressure is prevented.

Below the chute M is a transverse trough N hung from the main frame on links N' whereby it is adapted to oscillate or shake to discharge the peanuts therefrom onto a second endless conveyer O running over pulleys O' O' respectively on the side of the main frame at bottom and top. The trough N receives its motion through a vertical rock shaft $n$ journaled on the side of the frame and having arms $n'$ $n^2$ at top and bottom and connected respectively to the screen L by a link and pin $n^3$ and to the trough by a link $n^4$ whereby when the screen is moved, its motion is imparted to the rock shaft and through the latter to the trough as will be readily understood from an inspection of Fig. 3. The conveyer O which receives the peanuts from the trough N carries them up to the top of the frame and drops them into the hopper $P^3$ of what I shall term the stemming and grading mechanism.

By reference to Figs. 3, 5 and 6 it will be seen that a supplemental frame or casing P is arranged beside the main frame in the top of which is located the stemming mechanism consisting in the preferred construction of a casing having a semi-cylindrical bottom formed with curved slats $p$ supported on transverse timbers $p'$, with a rotary stemmer or stemmer cylinder working within the same. This stemming cylinder is formed by a shaft $q$ journaled in the supplemental casing and receiving its motion which is relatively slow, through a pulley $q'$ and belt $q^2$ driven from the upper pulley of the conveyer O. On the shaft are secured a series of pairs of arms Q the leading arm of each pair being saw edged to facilitate the operation upon the peanuts and the arms of each pair are connected by wire netting thus forming a conveyer which will tend to move the peanuts toward the discharge end of the stemming cylinder whence they are discharged through the opening Q'. As before stated the edges of the leading arms of the stemmer are serrated or have a series of teeth thereon to facilitate the action of the same upon the peanuts to cut off the short stems and furthermore the ends of the arms are curved as shown at $q^5$ and adapted to pass in between the ribs or curved strips $p$ of the casing to remove and move along any of the peanuts which might lodge or get caught therein thereby keeping the cylinder clean and preventing the cutting and spoiling of the peanuts.

To properly accommodate the ends of the arms, the supports $p'$ for the ribs or slats $p$ are notched out for their passage and to prevent the lodgment of any of the peanuts on the first support $p'$ as well as to increase the efficiency of the machine at this point, a series of slats R are suspended from the cover R' of the casing and are adapted to hang in between the pairs of arms as shown in Figs. 5 and 6. The stems having been now cut from the peanuts the latter together with such fine particles as do not work through the cylinder pass out through the opening Q' into a hopper formed preferably by the top $s$ of the fan casing S from whence they tail down over the mouth of the blower casing into a chute T which conveys them to the final measure or receptacle. The fan S is preferably provided with a cut off or gate S' for regulating the blast and in front of its mouth are arranged two or more chutes as T, T', for the reception of the peanuts of different grades. In operation the blast is regulated to blow out all very light stems and shells and to blow the lighter peanuts beyond the first chute, while the heavier peanuts travel down through and against the blast and constitute the first quality peanuts. The second quality passing down through the chute T' is caught in a receptacle or box $T^2$ from which they may be removed and deposited in bags or other vessels in the ordinary manner.

The fan receives its motion from the pulley F on the shaft $q$ through the belt and pulley F', see Fig. 3, and the movable parts in the main casing before referred to receive their motion as follows: The beater cylinder shaft is provided on the outside with a pulley U Fig. 3 around which passes a belt $u$ driven from an engine or other suitable source of power supply; said belt first passing over the idler or tightener pulley $u'$ and under the pulley $u^2$ on the force feed cylinder and after passing around the said pulley U it passes under an idler $u^3$ by which it is held away from the operating parts of the machine and thence back to the engine. Beside the pulley U on the beater shaft is a second somewhat smaller pulley V around which passes a belt $v$ running over and driving a pulley $v'$ on the forward shaft $I^2$. The pulley $v'$ is connected by a pitman $v^2$ with a crank $v^3$ on the rear shaft I'. Thus said shafts are caused to rotate in unison for feeding the vines back out of the machine. On the opposite end of this rear shaft I' is mounted a pulley W (see Fig. 1) around which passes a belt $w$ for conveying motion to the pulley $w'$ at the bottom of the frame, and the last mentioned pulley in turn imparts a reciprocatory movement to the tray H by being connected thereto by the rod $w^2$ in the well understood manner. The tray itself is preferably hung on links $w^3$ to facilitate its free vibration and it will be understood that it may be supported in any ordinary manner.

It only remains now to describe the means for imparting movement to the fan M' and pulley $k'$ for the conveyer from the latter to the pulley Q' of the conveyer Q. Primarily this drive mechanism consists of a belt Y passing around pulleys $y^3$, $y'$ and $y^2$ on the beater cylinder shaft, (Fig. 1,) fan shaft and conveyer pulley shaft respectively and around an idler $y^4$ for holding the belt out of the way. On the opposite side of the machine the shaft of the conveyer pulley $k'$ is provided with a pulley Z for the reception of a crossed belt which runs the upper pulley O' of the conveyer belt O and through said pulley and its shaft the stemming mechanism as before pointed out.

In operation the vines having the nuts thereon are placed on the hopper and allowed to feed into the force feed cylinder E from which they are taken by the beater and the nuts effectually removed. Here the nuts and vines are separated in a measure and the nuts drop down into the tray while the vines are caught on the grating G and worked over to allow all the nuts to drop out and finally ejected from the end of the machine by the conveyers or rake bars I. The separate nut and fine litter are next shaken out of the tray and elevated by the conveyer K to the screen and chute L M by which the litter is removed together with the imperfect nuts or such as have failed to feed out. After passing down the chute M to the trough N they are taken by the conveyer O and carried up to the top of the stemmer cylinder through which they pass to the cleaner and gravity separator to the receptacles provided for their final reception.

Having thus described my invention, what I claim as new, and desire to secure by Letters Patent, is—

1. In a machine for separating peanuts from the vines, the combination with the beater having radial arms, of the slatted casing having the segmental netting partitions between which the arms revolve substantially as described.

2. In a machine for separating peanuts from the vines, the combination with the beater having radial arms, of the casing having the slatted exterior and the segmental wire netting partitions co-operating with the beater cylinder at the inner edge and between which the arms revolve as set forth.

3. In a machine for separating peanuts from the vines, the combination with the casing having the openwork partitions, of the beater cylinder having grooves for the reception of the edge of the partitions and the radial arms on said cylinder revolving between the partitions as set forth.

4. In a machine for separating peanuts from the vines, the combination with the beater and openwork casing having partitions, of the grating below said beater, the tray below the grating and the vine conveyer above the grating substantially as described.

5. In a machine for separating peanuts from the vines, the combination with the beater and openwork casing having partitions of the grating below said beater the tray below the grating and the vine conveyer above the grating consisting of the rake bars having rearwardly curved teeth and mounted on oppositely cranked shafts, as set forth.

6. In a machine for separating peanuts from the vines, the combination with the beater and casing, of the grating below the same for separating the vines and peanuts consisting of the transverse lower slats and longitudinal upper slats and a conveyer for moving the vines longitudinally of the upper slats, as set forth.

7. In a machine for separating peanuts from the vines the combination with the beater and partitioned casing, the grating for separating the vines and nuts and a conveyer for the nuts of a shaking screen, a chute for the nuts from the screen and an air blast apparatus for directing a blast of air through said chute in the opposite direction to that in which the nuts are traveling as set forth.

8. In a machine for separating peanuts from the vines, the combination with the beater grating conveyer and shaking screen having the fingers at the lower end of the inclined chute for the nuts having its mouth beneath the fingers and an air blast apparatus for directing a current of air through said chute in the direction opposite the direction in which the nuts are traveling whereby the lighter particles are blown out and away as set forth.

9. In a machine of the character described, the combination with the stemming cylinder having the transversely arranged curved slats of the stemmer having the radial arms arranged in pairs connected by netting as set forth.

10. In a machine of the character specified the combination with the stemming cylinder having the transversely arranged curved slats of the rotary stemmer having the radial arms arranged in pairs connected by netting, the leading arm of each pair being toothed or serrated as set forth.

11. In a machine of the character specified the combination with the stemming cylinder having the curved slats of the rotary stemmer, having the radial arms arranged in pairs connected by netting, the ends of the arms being arranged to pass between the slats as set forth.

12. In a machine of the character specified, the combination with the stemming cylinder having the curved slats of the rotary stemmer, having the radial arms toothed and curved at the ends and the supports for the slats notched or cut away between the slats for the passage of the ends of the arms substantially as described.

13. In a machine of the character specified the combination with the stemmer cylinder having the discharge opening at one end and the entrance at the opposite end of the stemmer rotating in said cylinder and having the radial arms arranged in pairs one in front of the other and connected by netting whereby said stemmer acts as a conveyer to move the peanuts from the entrance to the discharge end.

In testimony whereof I affix my signature in presence of two witnesses.

WILLIAM A. CROCKER.

Witnesses:
VALENTINE J. SCATES,
HENRY LUX WARNER.